W. B. THOMPSON.
TIRE PROTECTOR.
APPLICATION FILED MAR. 19, 1913.
1,144,445.
Patented June 29, 1915.
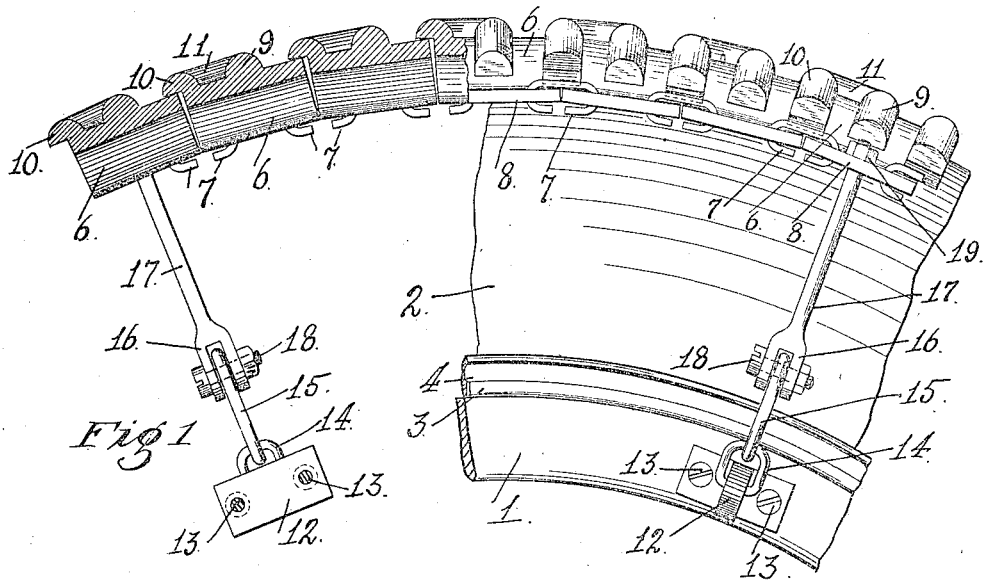
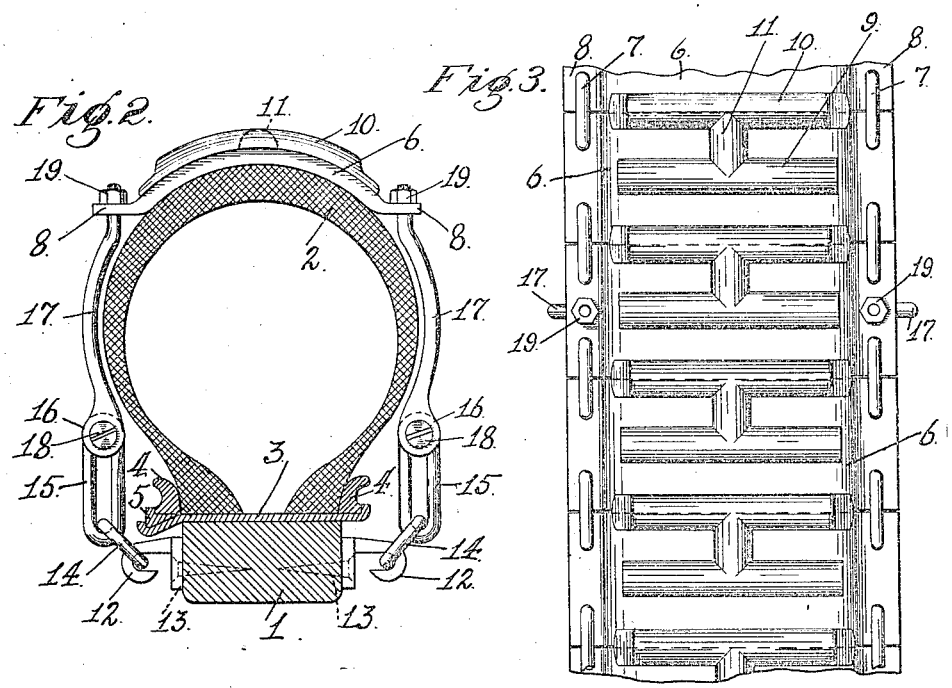
WITNESSES:
H. A. Stock.
S. Construe.
INVENTOR
William B. Thompson
BY
Wm. F. Booth
ATTORNEY

UNITED STATES PATENT OFFICE.

WILLIAM B. THOMPSON, OF LOS GATOS, CALIFORNIA.

TIRE-PROTECTOR.

1,144,445.

Specification of Letters Patent.  Patented June 29, 1915.

Application filed March 19, 1913. Serial No. 755,306.

*To all whom it may concern:*

Be it known that I, WILLIAM B. THOMPSON, a citizen of the United States, residing at Los Gatos, in the county of Santa Clara and State of California, have invented certain new and useful Improvements in Tire-Protectors, of which the following is a specification.

My invention relates to that class of tire-protectors in which an impenetrable flexible armor composed of articulated sections is employed.

The object of my invention is to provide a simple, economical, durable and effective protector of this type, and to this end my invention consists in the novel tire-protector which I shall now fully describe, by reference to the accompanying drawings, in which—

Figure 1 is a broken part side elevation and part circumferential section of my protector showing it applied to a tire. Fig. 2 is a cross section through the tire, showing the protector applied thereto. Fig. 3 is a plan of a broken section or portion of the protector.

1 is the rim of a wheel to which is fitted the casing or tire 2 in suitable manner, as, for example, by the rim plate 3, the side flanges 4 and the clamp 5.

6 are the individual sections of the protector. These sections are arranged in circumferential series and are articulated for flexibility by means of the links 7. Each section 6 is composed of some suitable material having in view resistance to wear, to fracture and to penetration. Steel is preferable in this connection. The sections 6 when united by their articulating links 7 form a circumferential series with spaces between the adjacent ends of the sections, which spaces in that portion of the series not affected by resting upon or pressure from the ground, widen outwardly, as shown in Fig. 1, so that in that portion which rests upon the ground and is consequently flattened from normal curvature the sections are enabled to bring their meeting ends together and fully close the spaces between them, as indicated in Fig. 3, whence it follows that as the danger exposed area of the tire to be protected is that which contacts with the ground, the sections, by closing together at that time and along that line of pressure, present fully closed joints where needed and still are flexibly articulated and may resume the curvature of the series when not resting on the ground. Each section is formed with a flange 8 on each side in which flanges the articulating links 7 are seated. The outer face or tread of each section 6 may be of a suitable character, preferably ribbed or roughened. The tread here shown is deemed the best. It consists of two cross ribs 9 and 10, and a central circumferential connecting rib 11, on each section. The cross rib 9 lies in or about the transverse middle of the section, while the rib 10 is at the end of the section and projects beyond said end sufficiently to symmetrically and slidingly overlap the end of an adjacent section, so that the spaces between the sections whether open or shut are always covered and while the sections are adapted to move relatively upon their articulations, a continuous tread surface is, nevertheless, presented by the overlapping or joint bridging ribs 10.

The sectional armor is fitted and held in place as follows:—To the rim 1 of the wheel on opposite sides and at several points around the circumference of said rim are securely fixed the hooks 12 in proper manner, as, for example, by bolts or by the screws 13, as here indicated. Engaging these hooks are links 14 which carry other links 15. The free ends of these last named links 15 fit in the bifurcated end 16 of the hangers 17 and are held therein by the bolts 18. The hangers 17 are best curved outward, as seen in Fig. 2, to better avoid the tire. The other ends of the hangers engage and are secured to the armor sections 6 through the flanges 8 of said sections, said hanger ends receiving nuts 19. These connections, it will be seen, hold the armor to the tire, but are essentially and sufficiently yielding to present no interference with the articulations of the armor, nor to interfere in any way with the resiliency of the tire.

To fit the protector to the tire, the latter is deflated in whole or in part; the armor is then placed around the tire, and the links 14 are fitted upon the hooks 12. Thereupon the tire is inflated. Necessary adjustments are possible at the several connections. To remove the armor, any one of the articulating links 7 may be removed, for example, by cutting it, whereupon the whole protector may be taken off.

I claim:—

1. A tire protector for vehicle wheels comprising a series of plates which embrace the tread of the tire, said plates having their adjacent edges formed to leave spaces between them which widen outwardly between those plates not resting on the ground and which close between those plates which rest upon the ground and said plates being formed at each side of the tire with extensions which project beyond the sides of the tire, a curved arm adjustably connected to each of said extensions and embracing the sides of the tire, said arms extending to a point adjacent the wheel felly, and a flexible connection between said arms and the felly.

2. A tire protector for vehicle wheels comprising plates which embrace the tread of the tire, said plates having their adjacent edges formed to leave spaces between them which widen outwardly between those plates not resting on the ground and which close between those plates which rest upon the ground and said plates being formed with extensions which project beyond the sides of the tire, arms having an adjustable connection with said extensions, said arms being curved to embrace the sides of the tire, a link hingedly connected to the terminal of each arm, and a flexible connection between said link and the wheel felly.

3. A tire protector for vehicle wheels comprising plates which embrace the tread of the tire, said plates having their adjacent edges formed to leave spaces between them which widen outwardly between those plates not resting on the ground and which close between those plates which rest upon the ground and said plates being formed with extensions which project beyond the sides of the tire, arms having an adjustable connection with said extensions, said arms being curved to embrace the sides of the tire, a link pivotally supported on the lower terminal of each arm, a second link having a sliding connection with the first mentioned link and a pivotal connection with the wheel felly.

4. A tire protector for vehicle wheels comprising a series of plates which embrace the tread of the tire, said plates having their adjacent edges formed to leave spaces between them which widen outwardly between those plates not resting on the ground and which close between those plates which rest upon the ground, said plates having on their outer faces cross ribs which slidingly bridge and cover the spaces between them, and said plates being formed at each side with extensions which project beyond the sides of the tire; curved arms adjustably connected to said extensions and embracing the sides of the tire; and a flexible connection between said arms and the wheel felly.

5. A tire protector for vehicle wheels comprising a series of plates which embrace the tread of the tire, said plates having their adjacent edges formed to leave spaces between them which widen outwardly between those plates not resting on the ground and which close between those plates which rest upon the ground, said plates being formed at each side with extensions which project beyond the sides of the tire; links fitted to adjacent extensions hingedly connecting the plates in an articulated series; curved arms adjustably connected to said extensions and embracing the sides of the tire; and a flexible connection between said arms and the wheel felly.

6. A tire protector for vehicle wheels comprising a series of plates which embrace the tread of the tire, said plates having their adjacent edges formed to leave spaces between them which widen outwardly between those plates not resting on the ground and which close between those plates which rest upon the ground, said plates having on their outer faces cross ribs which slidingly bridge and cover the spaces between them, and said plates being formed at each side with extensions which project beyond the sides of the tire; links fitted to adjacent extensions hingedly connecting the plates in an articulated series; curved arms adjustably connected to said extensions and embracing the sides of the tire; and a flexible connection between said arms and the wheel felly.

In testimony whereof I have signed my name to this specification in the presence of two subscribing witnesses.

WILLIAM B. THOMPSON.

Witnesses:
 WM. F. BOOTH,
 D. B. RICHARDS.